United States Patent
Colclazier et al.

(10) Patent No.: US 10,447,078 B2
(45) Date of Patent: Oct. 15, 2019

(54) SMART FUNCTION BLOCK FOR INTEGRATION OF PLCS INTO A CONTROL SYSTEM AND METHODS FOR THE SAME

(71) Applicant: FISHER-ROSEMOUNT SYSTEMS, INC., Round Rock, TX (US)

(72) Inventors: Deborah R. Colclazier, Round Rock, TX (US); Gary Law, Georgetown, TX (US); David Mark Smith, Round Rock, TX (US); Kenneth Marks, Austin, TX (US); Alper Enver, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 184 days.

(21) Appl. No.: 15/722,657

(22) Filed: Oct. 2, 2017

(65) Prior Publication Data
US 2019/0103763 A1    Apr. 4, 2019

(51) Int. Cl.
*G05B 15/02*    (2006.01)
*G05B 23/02*    (2006.01)
(Continued)

(52) U.S. Cl.
CPC .......... *H02J 13/0079* (2013.01); *G05B 15/02* (2013.01); *G05B 23/027* (2013.01); *G05B 23/0283* (2013.01); *H02J 3/04* (2013.01)

(58) Field of Classification Search
CPC .... G06F 11/0793; G06F 11/221; G06F 13/20; G06F 13/4221; G06F 3/0418; G06F 9/4411; H04L 41/0886; H04L 49/30
(Continued)

(56) References Cited

U.S. PATENT DOCUMENTS 5,978,593 A    11/1999    Sexton
7,519,083 B2    4/2009    Stevenson et al.
(Continued)

FOREIGN PATENT DOCUMENTS

CN    1920712 A    2/2007
CN    204389996 U    6/2015
EP    2 357 542 A1    8/2011

OTHER PUBLICATIONS

Search Report for Application No. GB1814978.1, dated Mar. 14, 2019.

*Primary Examiner* — Michael J Brown
(74) *Attorney, Agent, or Firm* — Marshall, Gerstein & Borun LLP

(57) ABSTRACT

A method for configuring a process control system includes coupling an I/O module to a PLC coupled to field devices. For each field device, the PLC has registers storing data of values associated with the field device. The PLC is configured such that each field device is associated with a PLC control tag, and each control tag is associated with tag parameters corresponding to the registers for the field device. The method includes configuring the I/O module to associate the tag parameters with corresponding controller parameters such that, for each control tag, there is a set of controller parameters associated with the tag parameters for the control tag. The method includes instantiating an integration object and associating the integration object with one of the control tags. The integration object configures itself, according to the set of controller parameters that is associated with the tag parameters for the control tag, as an analog input function block, a discrete input function block, an analog output function block, or a discrete output function block.

23 Claims, 11 Drawing Sheets

(51) Int. Cl.
   *H02J 3/04*    (2006.01)
   *H02J 13/00*   (2006.01)
   *G06F 11/07*   (2006.01)
   *G06F 13/20*   (2006.01)

(58) Field of Classification Search
   USPC .......................................................... 700/83
   See application file for complete search history.

(56) References Cited

U.S. PATENT DOCUMENTS

| | | | |
|---|---|---|---|
| 7,561,930 B2 | 7/2009 | Sokolova et al. | |
| 7,822,495 B2 | 10/2010 | Nixon et al. | |
| 8,600,524 B2 | 12/2013 | Law et al. | |
| 9,086,688 B2 | 7/2015 | Law et al. | |
| 9,086,692 B2 | 7/2015 | Nixon et al. | |
| 2004/0259533 A1* | 12/2004 | Nixon | H04W 76/14 |
| | | | 455/414.1 |
| 2005/0197803 A1* | 9/2005 | Eryurek | G05B 23/0289 |
| | | | 702/185 |
| 2012/0253477 A1* | 10/2012 | Hodson | G05B 19/0426 |
| | | | 700/12 |
| 2015/0280978 A1* | 10/2015 | Ye | H04W 24/02 |
| | | | 370/254 |
| 2018/0292098 A1* | 10/2018 | Bandyopadhyay | F24F 11/30 |

* cited by examiner

| Name | Type | Description | Parameter Value |
|---|---|---|---|
| CT001 —138 | Device Tag | | |
| AI_PV —140 | Parameter | | 0 |
| STATUS —142 | Parameter | | 0 |
| ALM_LOLIM —144 | Parameter | | 0 |
| ALM_HILIM —146 | Parameter | | 0 |
| EUMIN —148 | Parameter | | 0 |
| EUMAX —150 | Parameter | | 0 |
| EUSTR —152 | Parameter | | 0 |

FIG. 4A

| Register | Value |
|---|---|
| 9000 | 68 |
| 9001 | 0 |
| 9002 | -5 |
| 9003 | 105 |
| 9004 | 0 |
| 9005 | 100 |
| 9006 | % |
| ... | ... |

FIG. 4B

| Controller Parameter | PLC Parameter |
|---|---|
| AI_PV | Val |
| STATUS | SrcQ_IO |
| ALM_LOLIM | PSet_LoLim |
| ALM_HILIM | PSet_HiLim |
| EUMIN | Cfg_PVEUMin |
| EUMAX | Cfg_PVEUMax |
| EUSTR | Cfg_EU |

FIG. 4C

Composite Block CT001 with inputs IN1–IN7 mapped to registers #9000–#9006, and output OUT. (154)

FIG. 4D

| Register | Parameter | Data Type | Data Direction |
|---|---|---|---|
| 9000 | Val | REAL | Input |
| 9001 | SrcQ_IO | SINT | Input |
| 9002 | PSet_LoLim | REAL | Input |
| 9003 | PSet_HiLim | REAL | Input |
| 9004 | Cfg_PVEUMin | REAL | Input |
| 9005 | Cfg_PVEUMax | REAL | Input |
| 9006 | Cfg_EU | STRING_8 | Input |
| ... | ... | ... | ... |

FIG. 4E

| Register | Tag Parameter | Signal Tag | Data Type | Data Direction |
|---|---|---|---|---|
| 9000 | Val | TANK_NORTH_TEMP | REAL | Input |
| 9001 | SrcQ_IO | TANK_NORTH_TEMP | SINT | Input |
| 9002 | PSet_LoLim | TANK_NORTH_TEMP | REAL | Input |
| 9003 | PSet_HiLim | TANK_NORTH_TEMP | REAL | Input |
| 9004 | Cfg_PVEUMin | TANK_NORTH_TEMP | REAL | Input |
| 9005 | Cfg_PVEUMax | TANK_NORTH_TEMP | REAL | Input |
| 9006 | Cfg_EU | TANK_NORTH_TEMP | STRING_8 | Input |
| ... | ... | ... | ... | ... |

New Control Tag – TANK_NORTH_TEMP

Tag Definition: FixedAI
Modified: Jun 25 2015 12:11:53 PM

Description:

Parameter Map:

| Controller Parameter | Tag Parameter | Register Signal Tag |
|---|---|---|
| AI_PV | VAL | RTH_TEMPAI_PV001 |
| STATUS | SRCQ_IO | TH_TEMPSTATUS001 |
| ALM_LOLIM | PSet_LoLim | TEMPALM_LOLIM001 |
| ALM_HILIM | PSet_HiLim | TEMPALM_HILIM001 |
| EUMIN | Cfg_PVEUMin | RTH_TEMPEUMIN001 |
| EUMAX | Cfg_PVEUMax | RTH_TEMPEUM| |
| EUSTR | CFG_EU | |

OK  Cancel  Help

FIG. 8

SMART FUNCTION BLOCK FOR INTEGRATION OF PLCS INTO A CONTROL SYSTEM AND METHODS FOR THE SAME

FIELD OF THE DISCLOSURE

The present disclosure generally relates to function blocks for use in process plants, and more particularly to a function block facilitating integration into a distributed control system of programmable logic controllers and similar devices.

BACKGROUND

Distributed process control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a process engineer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

In many distributed process control systems, each field device in the process plant is assigned a unique device tag. The unique device tag provides an easy way to reference the corresponding field device. Device tags may be used during the configuration of the process control system to specify the source or destination, respectively, of an input or output to a function block in a control module. Each signal type has associated with it a particular format or set of information, and the device tag for a particular device may have associated with it a specific signal type such that when the device tag is associated with an input or output of a function block, the function block knows the format and information associated with the signal. In cases in which a field device has multiple signals associated with it (e.g., a valve may measure and transmit both pressure and temperature), device signal tags may be associated with each signal of the field device. During configuration, I/O cards associated with particular field devices are programmed convert data from formats implemented by the controller 40 to formats implemented by the field devices, and vice versa.

Additionally, in many processes, Programmable Logic Controllers (PLCs) are integrated into the process. PLCs traditionally store values from the various field devices to which they are connected in a series of numbered memory registers which, in some cases, are loosely organized, if they are organized at all. The PLC is programmed to control the field devices according to the information in the registers.

Integrating the PLCs and associated field devices into the control system is tedious, requiring that each register used in the control strategy programmed into the controllers is individually verified, a process which for large process plants can take months. Additionally, signals brought into the process control network from PLCs do not have the same format or information as a device tag wired directly to the distributed control system (i.e., to the controller via the I/O cards). The same information that would be associated with a single device tag in a configuration that did not include intermediary PLCs may, when coupled to a PLC, be stored in multiple different registers in the PLC. As a result, traditional I/O function blocks do not readily integrate signals from PLCs as I/O inputs, because the information those function blocks expect to receive is not readily provided to the function blocks. Instead, users (e.g., process control plant personnel) are left to configure custom function blocks that retrieve the information from the PLC registers and behave like the device signal tags such that the signals can be used with provided components (e.g., graphical components) that are provided with the process control system. By way of example, a standard graphic for displaying an analog process value output by a field device may expect to receive an output from an analog input (AI) function block that, itself, expects to receive a set of parameters associated with the output from the device (e.g., process value, set point, alarm limits, mode, scale, etc.). When the field device is coupled to the process control system via a PLC, there is no easy way to provide the set of parameters to the function block, as the various ones of the parameters are stored in individual (and often disparate) numerically addressed registers in the PLC.

SUMMARY

The systems and methods as described herein relate to integration of programmable logic controllers and associated hardware into distributed process control systems.

In embodiments, a method for configuring a process control system for controlling a process in a process plant includes communicatively coupling an input/output (I/O) module to a programmable logic controller (PLC) that is, in turn, communicatively coupled to a plurality of field devices. The PLC has, for each of the plurality of field devices, one or more registers storing data of values associated with the respective field device, and is configured such that each of the plurality of field devices is associated with a PLC control tag. Each PLC control tag is associated with one or more tag parameters corresponding to the one or more registers for the respective field device. The method also includes configuring the I/O module to associate the tag parameters with corresponding parameters of a controller such that, for each of the PLC control tags, there is a set of parameters of the controller that is associated with the tag parameters for the PLC control tag. Further, the method includes instantiating an integration function block object, and associating the integration function block object with a one of the PLC control tags. The integration function block automatically configures itself, according to the set of parameters of the controller that is associated with the tag parameters for the PLC control tag, as one of the group consisting of: an analog input function block, a discrete input function block, an analog output function block, a discrete output function block, and a custom input or output function block.

In additional embodiments, an integration function block for downloading to a controller in a process control system for controlling a process in a process plant, is operable to receive as a configuration parameter a control tag corresponding to one of a plurality of field devices in the process plant. The plurality of field devices is coupled to a programmable logic controller (PLC). The integration function block is further operable to automatically configure itself, according to a set of parameters associated with the control tag, as one of the group consisting of: an analog input function block, a discrete input function block, an analog output function block, a discrete output function block, and a custom input or output function block.

In still further embodiments, a system for controlling a process in a process plant includes a plurality of field devices operating to process materials in the process plant, a controller programed to send signals to and receive signals from the plurality of field devices, to effect control of the process in the process plant, and an input/output (I/O) module disposed between the controller and the plurality of field devices and operating to communicate the signals to the plurality of field devices from the controller and to communicate the signals from the plurality of field devices to the controller. The system also includes a programmable logic controller (PLC) disposed between a subset of the plurality of field devices and the I/O module. The PLC operates to control to the subset of the plurality of field devices and has a plurality of registers associated with each of the subset of the plurality of field devices. The system further includes an integration function block instantiated in the controller, operable, during configuration, to receive an assignment of a set of the registers of the PLC device. The set of the registers of the PLC device corresponds to PLC parameters of a one of the subset of the plurality of devices, and each register corresponds to a parameter of the one of the subset of the plurality of devices. The integration function block is also operable, during configuration, to create an association between the PLC parameter for each register in the set of registers and a corresponding parameter of the controller.

BRIEF DESCRIPTION OF THE DRAWINGS

The features and advantages of the methods, apparatus, and systems described herein will be best appreciated upon reference to the following detailed description and the accompanying drawings, in which:

FIG. 4A depicts an example series of registers in the memory of a PLC;

FIG. 4B illustrates example naming conventions for a process variable signal;

FIG. 4C depicts an example custom function block;

FIG. 4D shows example correspondences between PLC parameter names and the registers of the PLC;

FIG. 4E illustrates correspondences between a control tag and tag parameter and a register location of the PLC;

FIG. 8 depicts an second example GUI for associating registers in a PLC with tag parameters for a tag definition.

DETAILED DESCRIPTION

Figure 1:
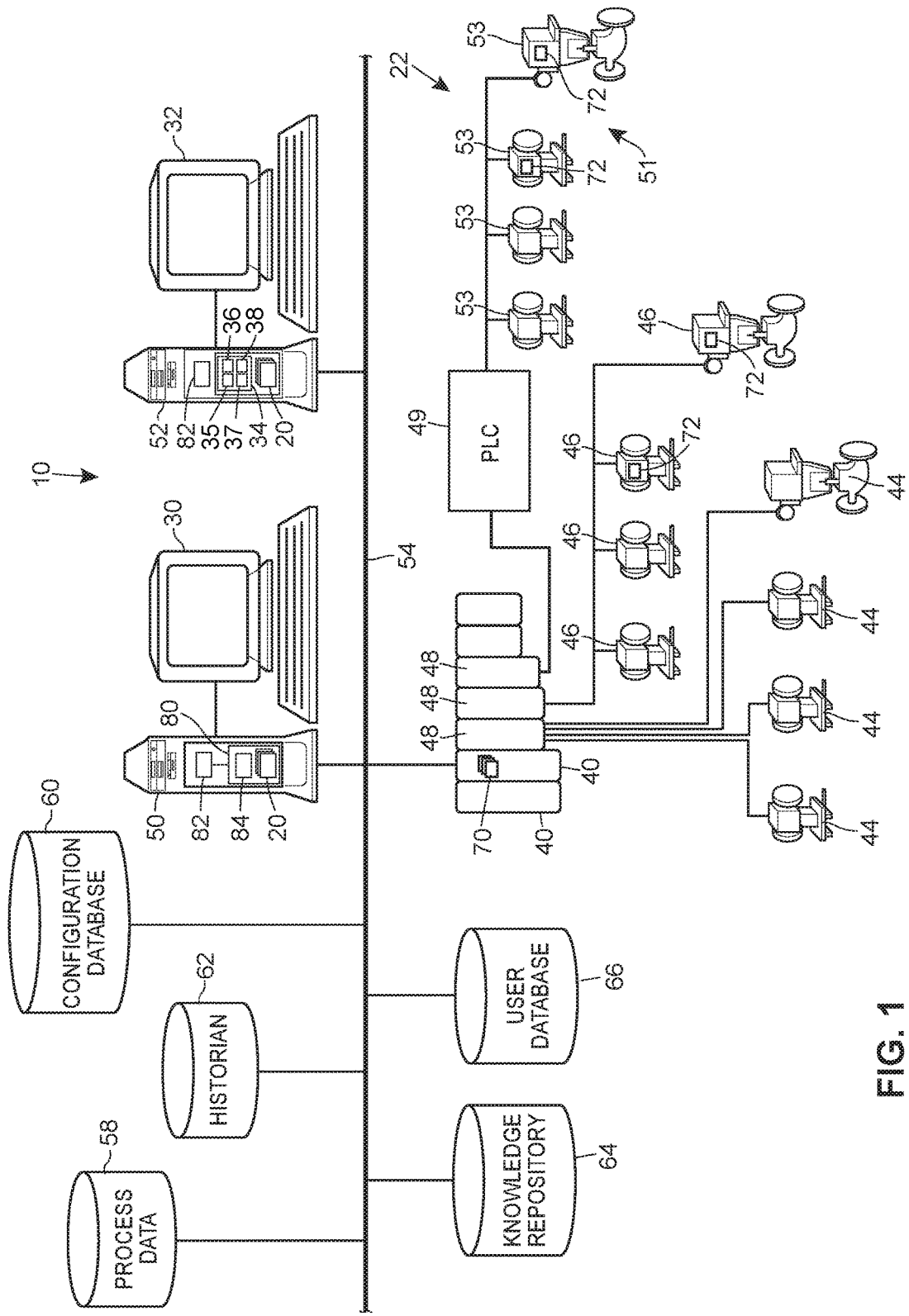
FIG. 1 is a block diagram of an example process plant.

FIG. 1 illustrates an example process plant network 10 in which a graphical configuration application facilitates easy integration of a PLC into the process control system. In so doing, the configuration application may more efficiently couple field devices connected to the PLC to graphical elements for user displays, which graphical elements can be used in one or more viewing or monitoring applications 20 to supervise or control the operation of the process plant 10 and, in this particular case, a distributed control system 22 implemented within the process plant 10. The viewing or monitoring applications 20 generally include a user interface application that uses various different displays to graphically depict process graphics to each of the operator and the maintenance technician and/or other users at workstations, such as workstations 30 and 32.

The graphical configuration environment of FIG. 1 also includes a graphical configuration system 34. The graphical configuration system 34 generally facilitates the creation of control and monitoring schemes, including graphical displays, for control of the process plant. The graphical configuration system 34 may include, for example, a configuration editor 35 that can be used to control modules and control module templates, graphical displays and templates, and other aspects of the control system, that are stored in a library, and that can be subsequently used to create instances or usages that are actually executed in the control of the process plant by downloading instances of the control modules to a controller, or by executing instances of the graphical displays in user displays presented to, for example, the operator and maintenance person, during operation of the plant 10. Of course, each of the graphics configuration system 34, the configuration editor 35, and the various control modules, templates, and graphical displays may be stored in a tangible computer readable memory or medium and execute on one or more processors to perform the functions described herein.

As is typical, the distributed process control system 22 illustrated in FIG. 1 has one or more controllers 40, each of which is connected to one or more field devices 44 and 46 (which may be smart devices) via input/output (I/O) devices or cards 48 which may be, for example, Fieldbus interfaces, Profibus interfaces, HART interfaces, standard 4-20 ma interfaces, etc. The controllers 40 are also coupled to one or more host or operator workstations 50-52 via a data highway 54 which may be, for example, an Ethernet link. A process data database 58 may be connected to the data highway 54 and operates to collect and store process variable, process parameter, status and other data associated with the controllers, field devices and any other devices within the plant 10. During operation of the process plant 10, the process data database 58 may receive process data from the controllers 40 and, indirectly, the field devices 44-46 via the data highway 54. The distributed process control system 22 illustrated in FIG. 1 also includes a PLC 49 coupled to an I/O device 48 and operating to control a subset 51 of field devices 53.

A configuration database 60 stores the current configuration of the process control system 22 within the plant 10 as downloaded to and stored within the controllers 40 and field devices 44, 46, and 53. The configuration database 60 stores process control functions defining the one or several control strategies of the process control system 22, configuration parameters of the devices 44, 46, and 53, the assignment of the devices 44, 46, and 53 to the process control functions, and other configuration data related to the process plant 10. The configuration database 60 may additionally store graphical objects or user displays as well as configuration data associated with these objects or displays as described in more detail herein to provide various graphical representations of elements within the process plant 10. Some of the stored graphical objects may correspond to process control functions (e.g., a process graphic developed for a certain PID loop), and other graphical objects may be device-specific (e.g., a graphic corresponding to a pressure sensor).

A data historian 62 (another database) stores events, alarms, comments and courses of action taken by operators. The events, alarms, and comments may pertain to individual devices (e.g., valves, transmitters), communication links (e.g., wired Fieldbus segments, WirelessHART communication links), or process control functions (e.g., a PI control loop for maintaining a desired temperature set point). Further, a knowledge repository 64 stores references, operator logbook entries, help topics, or links to these and other documentation that operators and maintenance technicians may find useful when supervising and maintaining the process plant 10. Still further, a user database 66 stores information about users such as the operator and the maintenance technician. For each user, the user database 66 may store, for example, his or her organizational role, an area within the process plant 10 with which the user is associated, work team association, security information, system privileges, etc.

Each of the databases 58-66 may be any desired type of data storage or collection unit having any desired type of memory and any desired or known software, hardware or firmware for storing data. Of course, the databases 58-66 need not reside in separate physical devices. Thus, in some embodiments, some of the databases 58-66 may be implemented on a shared data processor and memory. In general, it is also possible to utilize more or fewer databases to store the data collectively stored and managed by the databases 58-66 in the example system of FIG. 1.

While the controllers 40, I/O cards 48 and field devices 44, 46, and 53 are typically located within and distributed throughout the sometimes harsh plant environment, the operator workstations 50 and 52 and the databases 58-64 are usually located in control rooms or other less harsh environments easily assessable by controller, maintenance, and various other plant personnel. However, in some cases, handheld devices may be used to implement these functions and these handheld devices are typically carried to various places in the plant. Such handheld devices, and in some cases, operator workstations and other display devices may be connected to the plant network 22 via wireless communication connections.

As is known, each of the controllers 40, which may be, by way of example, the DeltaV™ controller sold by Emerson Process Management, stores and executes a controller application that implements a control strategy using any number of different, independently executed, control modules or blocks 70. Each of the control modules 70 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc., control, or an output function that controls the operation of some device, such as a valve, to perform some physical function within the process plant 10. Of course hybrid and other types of complex function blocks exist, such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc., and are not limited to being designed and implemented using the function block or any other particular programming technique. Each of the controllers 40 may also support the AMS® suite of applications sold by Emerson Process Management and may use predictive intelligence to improve availability and performance of production assets including mechanical equipment, electrical systems, process equipment, instruments, non-smart and smart field devices 44, 46, etc.

As described, the process control system 22 includes one or more controllers 40 communicatively coupled to the workstation(s) 50, 52 in the control room. The controllers 40 automate control of the field devices 44, 46, and 53 in the process area by executing process control strategies implemented via the workstations 50, 52. An example process strategy involves measuring a pressure using a pressure sensor field device and automatically sending a command to a valve positioner to open or close a flow valve based on the pressure measurement. The I/O cards 48 translate information received from the field devices 44, 46 to a format compatible with the controllers 40 and translate information from the controllers 40 to a format compatible with the field devices 44, 46. Various signal types or data types are associated with the field devices 44, 46, and 53. Generally speaking, these signal or data types include analog input (AI), analog output (AO), discrete input (DI), discrete output (DO), and the like. The I/O cards 48 enable the communicative coupling of the controller 40 to a plurality of the field devices 44, 46 associated with the different data types or signal types and different field device communication protocols by translating or converting information communicated between the controller 40 and the field devices 44, 46.

Through the I/O cards 48, the controller 40 may communicate with the field devices 44, 46 according to the control modules 70 that have been downloaded to the controller 40. The control modules 70 are programmed using the configuration system 34. In the configuration system 34, a process engineer may create the control modules 70 by, for instance, instantiating one or more function blocks. By way of example, the process engineer may instantiate an AI function block to receive an analog input from one of the field devices 44, 46, which AI function block may receive a variety of values (e.g., a signal value, alarm hi and low limits, a signal status, etc.) associated with the analog output of the field device 44, 46. The AI function block may output a corresponding signal to another function block (e.g., a proportional-integral-derivative (PID) control function block, a custom function block, a display module, etc.) Once the AI function block is instantiated, associating the function block with a unique device tag associated with the field device 44, 46, or a device signal tag associated with a specific signal of the field device 44, 46 will cause the function block, once downloaded to the controller 40, to cooperate with the appropriate I/O card 48 to process information from the correct field device 44, 46.

In some process control systems, however, programmable logic controllers are configured to control directly a subset of field devices, as illustrated by the subset 51 of field devices 53 in FIG. 1, which are controlled by the PLC 49. Though PLCs are used in many applications, one such arrangement in which the depicted configuration is frequently found is where a process control equipment manufacturer provides a pre-configured and separately operable process control hardware module (sometimes referred to as a "skid") for performing a specific function, that includes the field devices, wiring, and control ability enabling the skid to operate independently from the larger process control system 22. Of course, it is frequently preferable to be able to incorporate the skid into the larger process control system 22 such that the skid can be controlled and monitored via the workstations 50 and 52. FIG. 1 depicts the PLC 49 coupled to a controller 40 via an I/O device 48. Methods, systems, and configurations for accomplishing the integration of the PLC 49 and its subset 51 of field devices 53 into the larger process control system 22 will be described throughout this specification.

In any event, in the plant network 10 illustrated in FIG. 1, the field devices 44, 46, 53 connected to the controllers 40 may be standard 4-20 mA devices, may be smart field devices, such as HART®, Profibus, or FOUNDATION® Fieldbus field devices, which include a processor and a memory, or may be any other desired type of devices. Some of these devices, such as Fieldbus field devices (labeled with reference number 46 in FIG. 1), may store and execute modules, or sub-modules, such as function blocks, associated with the control strategy implemented in the controllers 40 or which perform other actions within the process plant, such as data collection, trending, alarming, calibration, etc. Function blocks 72, which are illustrated in FIG. 1 as being disposed in two different ones of the Fieldbus field devices 46, may be executed in conjunction with the execution of the control modules 70 within the controllers 40 to implement process control, as is well known. Of course, the field devices 44, 46, 53 may be any types of devices, such as sensors, valves, transmitters, positioners, etc., and the I/O devices 48 may be any types of I/O devices conforming to any desired communication or controller protocol such as HART, Fieldbus, Profibus, etc.

With continued reference to FIG. 1, the workstations 50 and 52 may include various applications that are used for various different functions performed by the personnel within the plant 10. Each of the workstations 50 and 52 includes a memory 80 that stores various applications, programs, data structures, etc., and a processor 82 which may be used to execute any of the applications stored in the memory 80. In the example illustrated in FIG. 1, the workstation 50 also includes, in addition to the display and viewing application 20, one or more process controller configuration applications 84 which may include, for example, control module creation applications, operator interface applications and other data structures which can be accessed by any authorized process engineer to create and download control routines or modules, such as the control modules 70 and 72, to the various controllers 40 and devices 46, 53 of the plant 10. The configuration applications also include the display or graphical configuration system 34 having the configuration editor 35, which may be used to create the control modules 70, as described in more detail herein.

Figure 2:
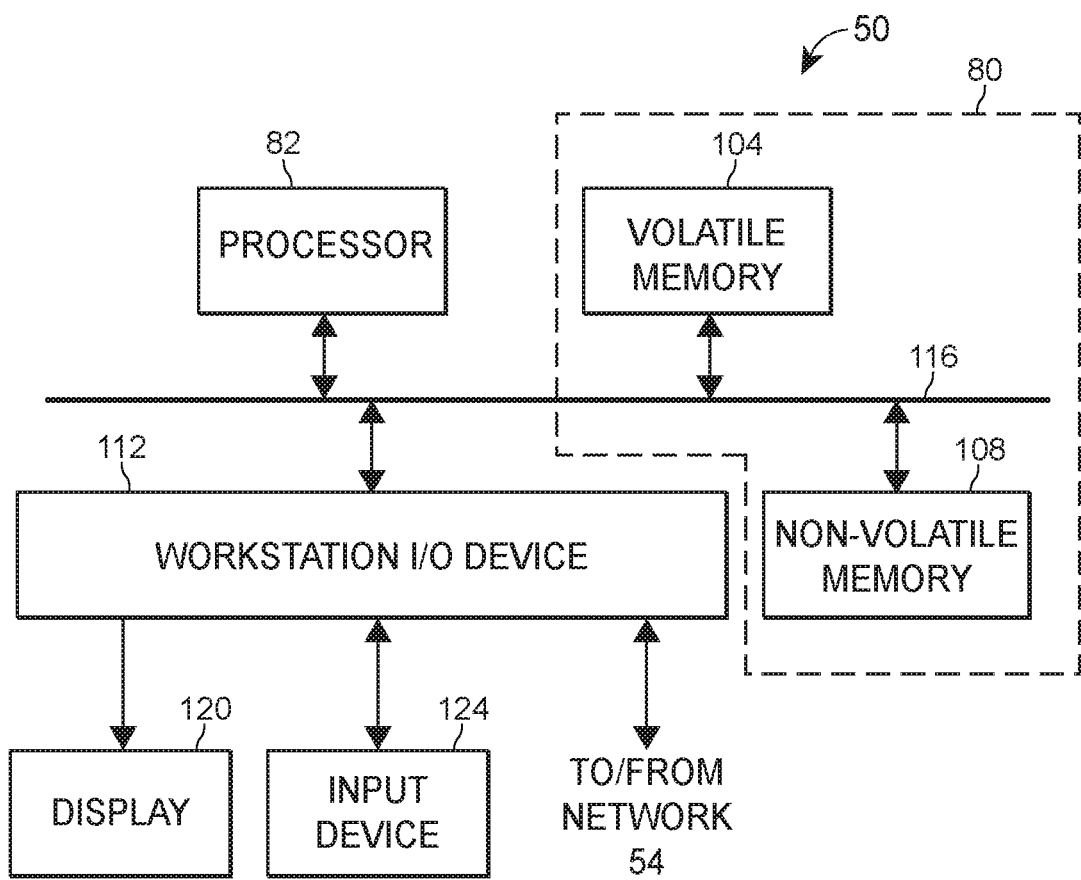
FIG. 2 is a block diagram of an example workstation schematically illustrated in FIG. 1.

FIG. 2 is a block diagram of an example workstation 50 (workstation 52 may comprise the same or similar device). The workstation 50 may include at least one processor 82, a volatile memory 104, and a non-volatile memory 108 (the volatile and non-volatile memories 104 and 108 together comprising the memory 80). The volatile memory 104 may include, for example, a random access memory (RAM). In some embodiments, the RAM may be backed up by one or more batteries so that data is not lost in the event of a power failure. The non-volatile memory 108 may include, for example, one or more of a hard disk, a read-only memory (ROM), a compact disk ROM (CD-ROM), a programmable ROM (PROM), an erasable programmable ROM (EPROM), an electrically erasable programmable ROM (EEPROM), a digital versatile disk (DVD), a flash memory, etc. The workstation 50 may also include a workstation I/O device 112. The processor 82, volatile memory 104, non-volatile memory 108, and workstation I/O device 112 may be interconnected via an address/data bus 116. The workstation 50 may also include at least one display device 120 and at least one user input device 124, which may be, for example, one or more of a keyboard, a keypad, a mouse, a track ball, a touch screen, a light pen, etc. In some embodiments, one or more of the volatile memory 104, non-volatile memory 108, and workstation I/O device 112 may be coupled to the processor 82 via a bus separate from the address/data bus 116 (not shown), or may be coupled directly to the processor 82.

The display device 120 and the user input device 124 are coupled with the workstation I/O device 112. Additionally, the workstation 50 is coupled to the network 54 via the workstation I/O device 112. Although the workstation I/O device 112 is illustrated in FIG. 2 as one device, it may comprise several devices. Additionally, in some embodiments, one or more of the display device 120 and the user input device 124 may be coupled directly to the address/data bus 116 or to the processor 82.

Referring now to FIGS. 1 and 2, the process control configuration system 34 associated with one or more of the workstations 30 and 32 may be stored on and executed by one or more of workstations 50 and 52. For example, the process control configuration system 34 could be stored on the non-volatile memory 108 and/or the volatile memory 104, and executed by the processor 82. However, if desired, this application could be stored and executed in other computers associated with the process plant 10. Generally speaking, the process control configuration system permits a programmer (e.g., a process engineer) to create and configure control routines, control modules, function blocks, programs, logic, etc., to be implemented by the controllers 40, I/O devices 48, and/or the field devices 44, 46, 53. These control routines, control modules, function blocks, programs, logic, etc., may then be downloaded to appropriate ones of the controllers 40, I/O devices 48, and/or field devices 44, 46, 53 via the network 54.

The control routines generally take the form of graphical diagrams in which each of the function blocks is connected (e.g., via graphical "wires" or "connections") to one or more signals and/or other function blocks. An AI function block may have an input connected to a signal from one of the field devices 46 and an output connected to the input of a second function block that receives data from the AI function block, performs some processing or calculation, and generates an output (e.g., a command for another the same or another of the field devices 46) that, in turn, is communicated via a connection from the output of the second function block to the input of an AO function block. The AO function block may receive the command from the connection to the output of the second function block, format the command, and provide an output from the output of the AO block, which may be connected to a signal to the field device for which the command is destined.

Figures 3A, 3B:
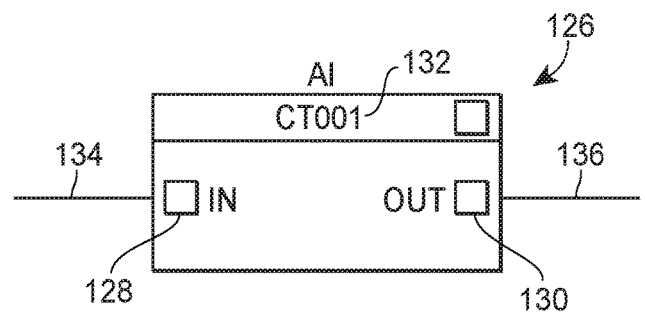
FIG. 3A is an example of a graphic associated with an AI function block.
FIG. 3B illustrates parameters associated with a device tag for the function block depicted in FIG. 3A.

FIG. 3A depicts an example of a graphic associated with an AI function block 126. The AI function block 126 includes an input 128, an output 130, and a signal name 132. A process engineer designing a control module may instantiate the AI function block 126 and connect the input 128 to a signal, for example, from a field device 44 or 46. In some instances, the connection of the input 128 to the signal from the field device 44 or 46 may be accomplished by using a graphical connection or wire 134 (e.g., when the signal is from another function block, instead of a field device). In other instances, the connection of the input 128 to the desired signal may be accomplished by associating a property of the function block with the desired signal. The process engineer may open a properties window (not shown) and provide a device tag (e.g., "CT001") or device signal tag as an input property. In embodiments such as this in which the connection of the input 128 to the desired signal is accomplished using a property field, the function block 126 may not have the input wire 134 and, in fact, the function block 126 may not depict the input 128 at all. The output 130 of the function block 126 may generally be connected to other function blocks in a similar manner and, in particular, by using a graphical connection or wire 136 to couple the output 130 to the input of another function block. When downloaded to the controller 40 (e.g., as one of the control modules 70) and executed, the input of the AI function block 126 will receive the data corresponding to the device tag or device signal tag configured as associated with the input 128, and will send data from the output 130 of the function block 126 to the input of the function block connected via the connection 136.

Each function block type (e.g., AI, AO, DI, DO, etc.) may have associated with it a variety of input parameters. That is, while the function block graphic 126 may show a single input, it will be appreciated that the information coming into the function block input 126—specified by the wire 134 or by the corresponding parameter—may include multiple parameters associated with the signal. Likewise, a given function block may have multiple output parameters, as well, depending on its function. Continuing with the AI function block example, an AI function block configured to receive a process variable from a field device 44, 46 in an embodiment generally includes, in addition to the value of the process variable (e.g., 4-20 mA), sufficient information to characterize and understand the meaning of the process variable value, as depicted in FIG. 3B. FIG. 3B illustrates that, for the device tag "CT001" 138, seven parameters 140-152 associated with a single signal are available. The seven parameters 140-152 include the process variable 140, the status of the signal 142, an alarm low-limit value 144, an alarm high-limit value 146, a minimum value in engineering units 148 (e.g., the value of the process variable at 4 mA), a maximum value in engineering units 150 (e.g., the value of the process variable at 20 mA), and an indication of the engineering units 152 (e.g., "deg"). In some instances, the field devices 44, 46 may transmit only the process variable signal (e.g., a 4-20 mA) signal. In some embodiments, the I/O device 48 may be programmed to add to that signal the parametric values that accompany it. For example, the I/O device 48 may be programmed to know that the 4-20 mA signal coming from a temperature transmitter corresponds to 20 degrees at 4 mA and 100 degrees at 20 mA. In other embodiments, that information is configured in the controller 40, and the controller receives the process variable from the field device and communicates to the function block the process variable and the associated parameter values.

In any event, when an input or output signal with which a function block is associated is sent to or received from a field device coupled to the controller 40 directly via the I/O devices 48, as is the case with the field devices 44 and 46 depicted in FIG. 1, the function block sends/receives the parameters associated with the device tag in a predictable manner. That is, the field devices 44, 46 transmit or receive data according to a standard that associates, for example, the parameter "AI_PV" 140 (see FIG. 3B) with a particular value (e.g., the first value) in a series of values transmitted/received by the function block.

However, when a PLC is in the communication path between the field device and the I/O device 48 (and the controller 40), as is the case with the PLC 49 through which the field devices 53 are coupled, this process can become complicated. Generally, PLCs store data in a series of registers. As a result, data associated with a particular field device 53 is stored in a plurality of registers in the PLC 49, before being communicated to/from the I/O device 48 and the controller 40. For instance, with respect to the AI parameters described above, the process variable value may be stored in a first register of the PLC 49, and other registers of the PLC 49 may be programmed to store additional parameters. The status of the analog input signal may be stored in a second register of the PLC 49, the low alarm limit may be stored in a third register of the PLC 49, and so on. The memory of the PLC 49 may be represented as a series of registers (e.g., locations in memory) and associated values, as illustrated in FIG. 4A.

While the values of the AI parameters described above are illustrated in FIG. 4A as stored in consecutive registers, those of ordinary skill in the art will recognize that there is no requirement that related values (e.g., values of parameters associated with a specific signal) be stored in consecutive registers, and will further appreciate that some parameter values may span multiple registers. In practice, consecutive registers in a PLC may contain parameter values associated with different signals, and the register value associated with a particular parameter may be arbitrary, so long as a correspondence between each register and its associated signal and parameter is mapped and can be determined by a process engineer configuring the system. For instance, actively changing values (such as the statuses of process variables and the values of the process variables) may be stored in a first series of registers, while the programmatic information about each signal (e.g., hi and lo alarm limits, engineering unit values, etc.) may be stored in a second series of registers elsewhere in a memory of the PLC device.

As should be appreciated by now, the configuration of process modules is greatly complicated by the presence of the PLC 49 coupled to the field devices 53, and the integration of the field devices 53 into the process control system 22 can, without mitigation, require additional programming steps during the configuration of plant by the process engineer, as well as tedious and time consuming validation and verification of every register value's proper integration into the process modules and function blocks that comprise the control scheme. Further complicating matters, the mapping of the parameters in the PLC may use different naming conventions than the parameters expected by the function blocks. FIG. 4B illustrates an example of naming conventions for a process variable signal in a hypothetical controller and PLC.

In the past, some process engineers have attempted to integrate the PLC 49 and associated field devices 53 into the process control system 22 by creating custom function blocks, such as that depicted in FIG. 4C. Using information about the correspondence between the PLC parameter names and the registers in the PLC (as depicted in FIG. 4D), and the correspondence between the PLC parameter names and the controller parameter names (as in FIG. 4B), the process engineer can create a composite function block 154 that receives as inputs each of the parameters 140-152 by individually receiving the data from the associated registers of the PLC 49. As depicted in FIG. 4C, a first input (IN1) may receive the data from the register 9000, which corresponds to the "Val" PLC parameter and the "AI_PV" parameter (i.e., the process variable) of the controller 40, a second input (IN2) may receive the data from the register 9001, which corresponds to the "SrcQ_IO" PLC parameter and the "Status" parameter of the controller 40, and so on. The composite function block 154 may be programmed to receive the various inputs and process them just as the AI function block would process them to provide an output.

Understandably, this solution is cumbersome, time consuming, and prone to errors for a variety of reasons. First, the process engineer must verify every register used. More importantly, however, because there are a variety of function block types (AI, AO, DI, DO, and countless function blocks for specialized I/O and processing/control), the process engineer must create a custom composite block 154 for each type of function block that sends data to or receives data from the PLC 49 and the field devices 53 associated with it.

In some embodiments, some of the issues described above are partially mitigated by implementation in the PLC of signal grouping according control tags that refer to specific signals from the field devices 53. In embodiments, data in the PLC 49 may be accessed according to an alphanumeric control tag and a tag parameter, rather than exclusively by a register location. In this manner, parameters such as process value, set point, alarm limits, modes, statuses, etc. for a single signal are all organized by a control tag. FIG. 4E illustrates this concept. In FIG. 4E, each PLC parameter ("Tag Parameter") for the CT001 device is associated with a control tag, "Tank_North_Temp"). Once again, while the values for the tag parameters for the control tag "Tank_North_Temp" are illustrated in FIG. 4E as stored in concurrent, adjacent registers, it should be understood that there is no requirement that the registers in which the values are stored by adjacent or concurrent. It is sufficient that the values associated with the various tag parameters for each control tag in the PLC 49 may be accessed using the control tag and tag parameter values.

Figure 5A:
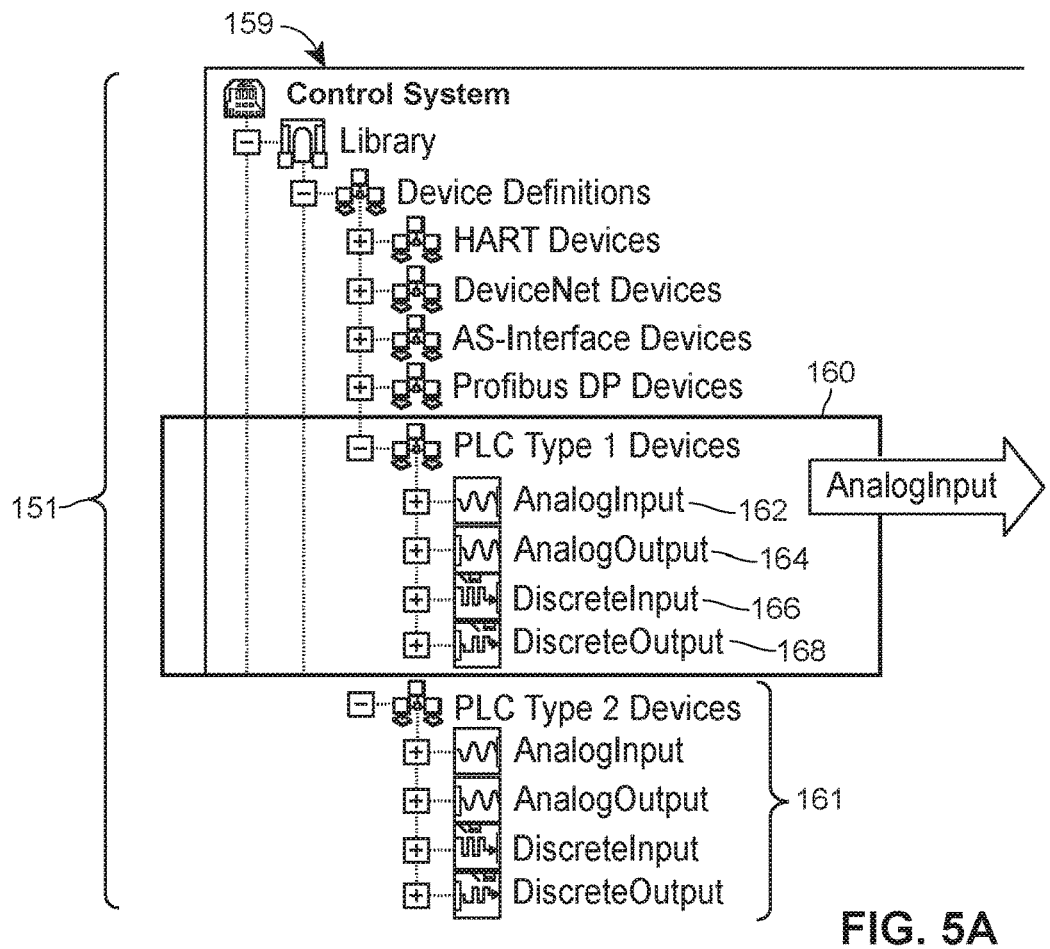
FIG. 5A depicts an embodiment of a portion of a graphical user interface (GUI) for configuring a function block.
Figure 5B:
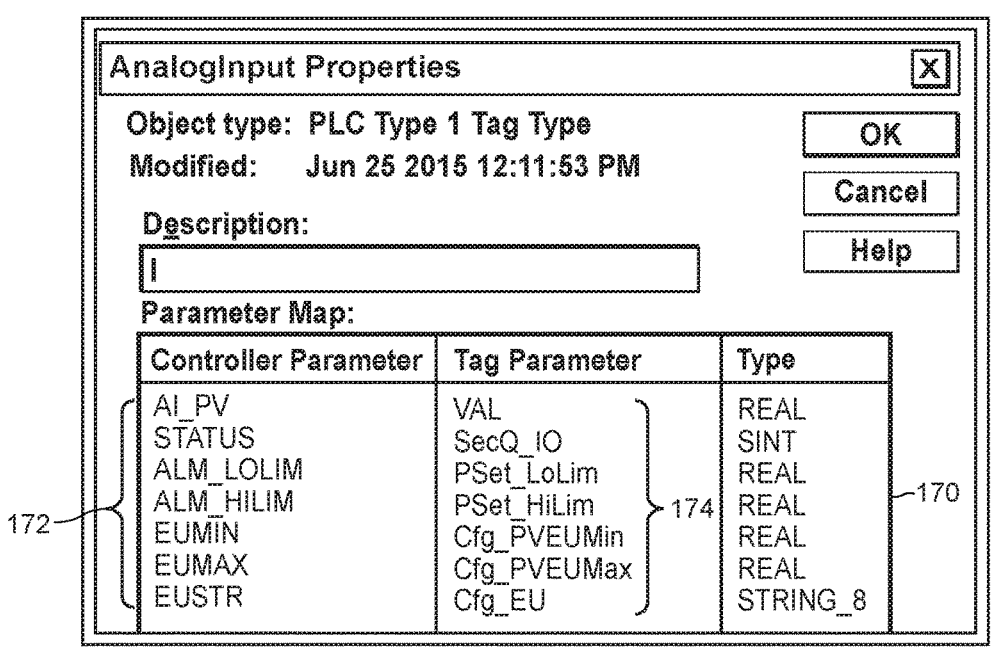
FIG. 5B is a first illustration of a parameter map defining the relationships between PLC tag parameters and parameters in the control system.

In embodiments, the configuration system 34 may include (e.g., in a library of components) one or more smart function blocks (also called "integration function blocks") that facilitate automatic integration of PLC devices into the distributed control system. The integration function blocks take advantage of the control tag information to automatically create, morph, and/or transform according to the parameters and data type associated with the control tag in the PLC. FIG. 5A depicts a portion 159 of graphical user interface for the configuration system 34, in an embodiment. The portion 159 illustrates a set 157 of library definitions associated with different device types in the process control system 22. The library definitions include a group 160 of definitions for integration function blocks for PLC-associated devices in the process control system 22 (e.g., including the devices 53). The group 160 of definitions is associated with a first type of PLC (e.g., a first PLC model or manufacturer). The group 160 of definitions displayed in FIG. 5A includes definitions for four types of integration function blocks 162, 164, 166, 168: AI function block definition 162, AO function block definition 164, DI function block definition 166, and DO function block definition 168. Each of the function block type definitions 162, 164, 166, 168 defines the relationships between the tag parameters 174 of the PLC 49 and the corresponding parameters 172 of the controller 40, as illustrated in FIG. 5B. A parameter map 170 (shown in the context of a properties box of the AI device type 162) displays the correspondence between the controller and PLC parameter names for the integration AI function block type.

Figure 5C:
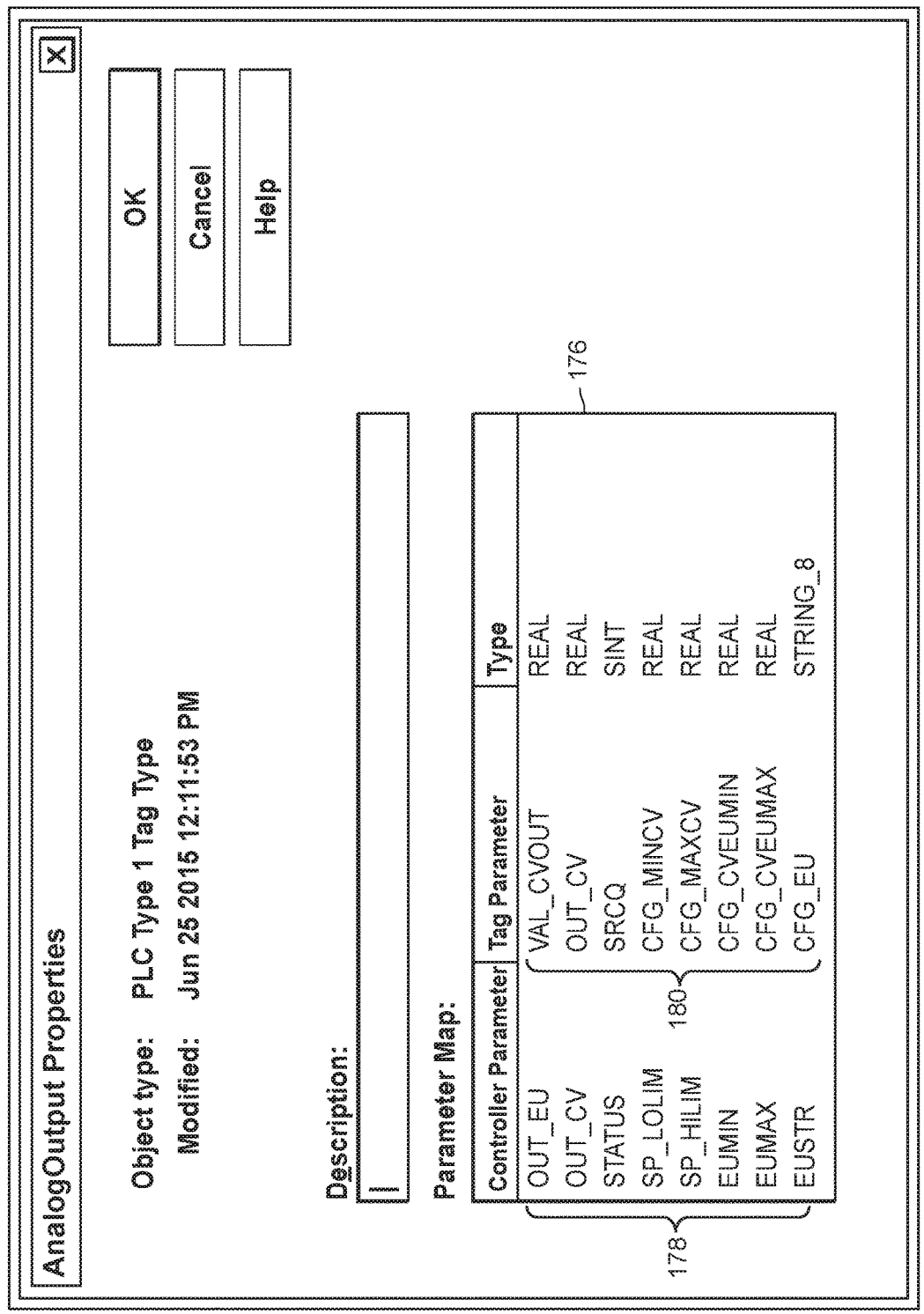
FIG. 5C is a first illustration of a parameter map defining the relationships between PLC tag parameters and parameters in the control system.

Of course, because each function block type includes different controller parameters, each of the integration function blocks will have a different mapping of controller parameters to PLC parameters. The AO function block definition 164 in FIG. 5A will have a different set of controller and PLC parameters than the AI function block definition 162, for instance. FIG. 5C depicts a similar parameter map 176 (shown in the context of a properties box of the AO function block definition 164) that displays the correspondence between controller parameters names 178 and PLC parameter names 180.

Additionally, it should be understood that different types of PLCs 49 may have different PLC parameter names that correspond to the controller parameter names. Accordingly, in embodiments, different groups of PLC integration function blocks may be defined for different types of PLCs (e.g., different models of PLCs, PLCs from different manufacturers, etc.). FIG. 5A depicts, in addition to the group 160 of integration function blocks definitions for a first PLC type, a group 161 of integration function block definitions for a second PLC type. With knowledge of the various available PLC types, the process control system 22 and, in particular, the configuration system 34, may be programmed to include a library of available building elements a variety of PLC integration function blocks "out of the box," so that the process engineer need not create integration function blocks for common function block types (e.g., AI, AO, DI, DO, etc.).

Generally, a process engineer using the configuration system 34, places function blocks, such as, for example, a generic AI function block, onto to the configuration sheet and/or module in the configuration design space of the configuration editor 35 (also sometimes referred to as a "canvas"). The process engineer then associates one or more device tags or device signal tags with the inputs of input function blocks (by connecting the input to a wire, or by associating the input with a tag, for example) and one or more outputs with the outputs of output function blocks, to instantiate communication between the function block and the device associated with the device tag or device signal tag.

Figure 6A:
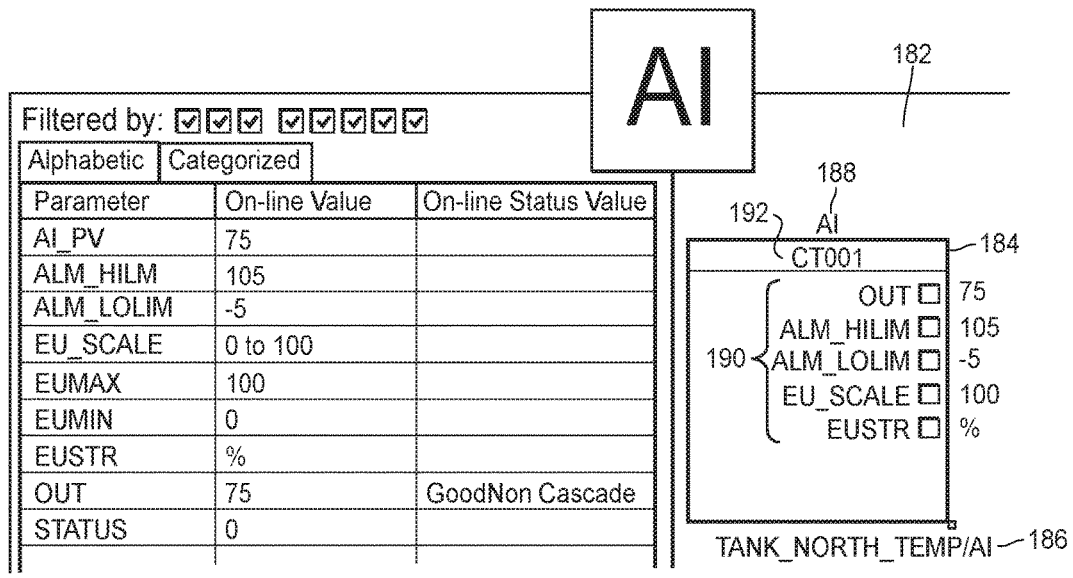
FIG. 6A is a first example integration function block instantiated in a configuration sheet.

In the case where the process engineer needs to bring into a process module a value from a field device 53 controlled by the PLC 49, the process engineer may place an integration function block such as, for example, an integration AI function block onto the configuration sheet or process module and may similarly associate the input of the integration AI function block with the desired PLC control tag name by connecting the input to a wire associated with the PLC control tag name or by associating a property field of the AI function block with the PLC control tag name. The integration function blocks may each be generic function blocks that transform upon being associated with a PLC control tag name into a function block that includes inputs and/or outputs similar to the composite block 154 depicted in FIG. 4C. In particular embodiments, the integration function blocks may have a plurality of outputs, each corresponding to a respective one of the signals associated with the PLC tag name. FIGS. 6A-6D depict examples of integration function blocks instantiated in a configuration sheet 182 and configured with a PLC control tag name. FIG. 6A depicts a configured integration AI function block 184. The AI integration function block 184 has an associated PLC control tag name, depicted as a label 186, and an associated function block type, depicted as a label 188. A label 192 indicates the device tag used by the controller 40 to refer to the associated field device 53. As illustrated in FIG. 6A, the integration AI function block 184 includes an indication of each of the PLC tag parameters 190 associated with the control tag name. In the AI function block 184, the association of the function block 184 with the PLC control tag name 186 configures the AI function block 184 to accept the various signals from PLC, and the function block 186 outputs each of the signals from a corresponding one of the outputs 190. In embodiments, the primary parameter (in the case illustrated in FIG. 6A, "AI_PV") is output as a signal "OUT".

Figure 6B:
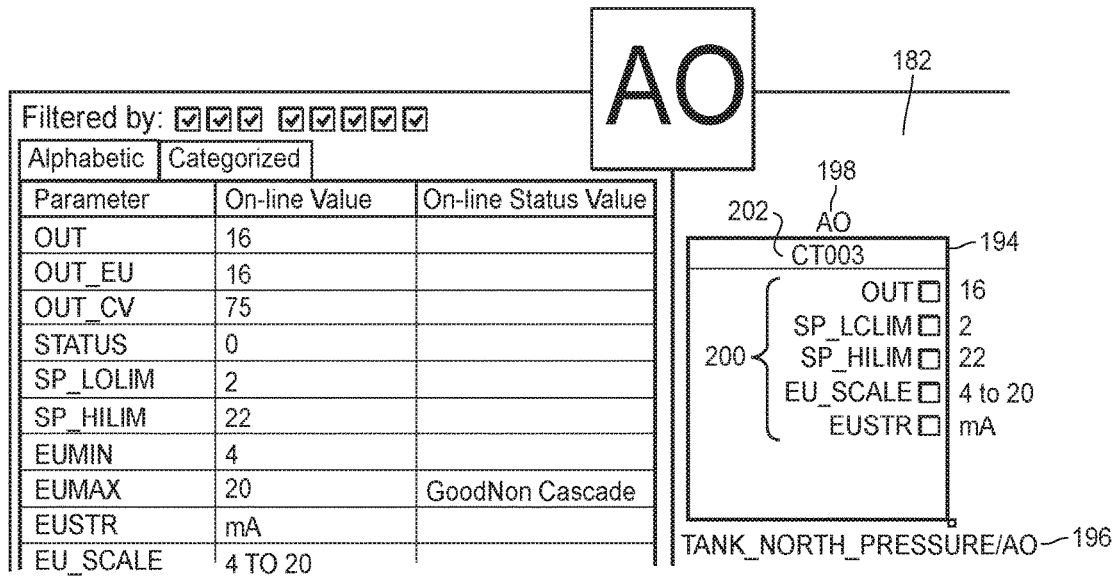
FIG. 6B is a second example integration function block instantiated in a configuration sheet.
Figure 6C:
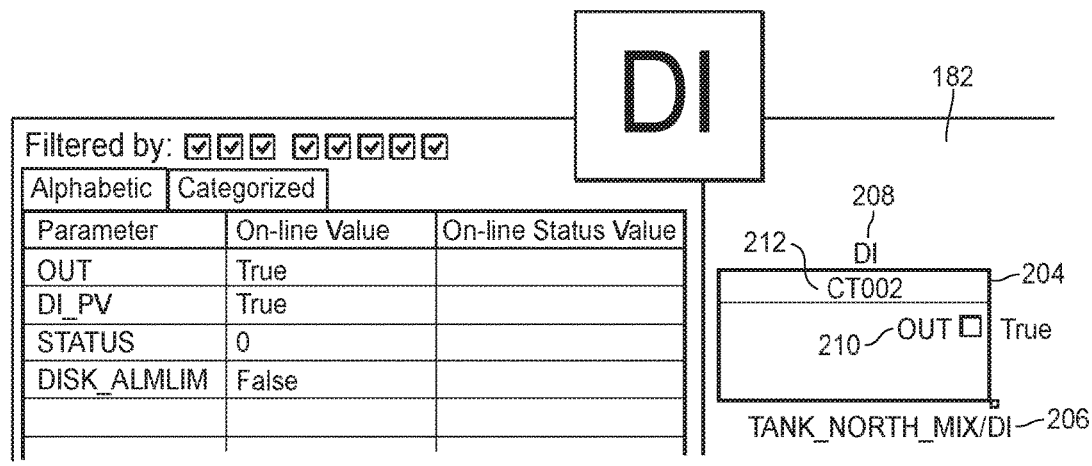
FIG. 6C is a third example integration function block instantiated in a configuration sheet.
Figure 6D:
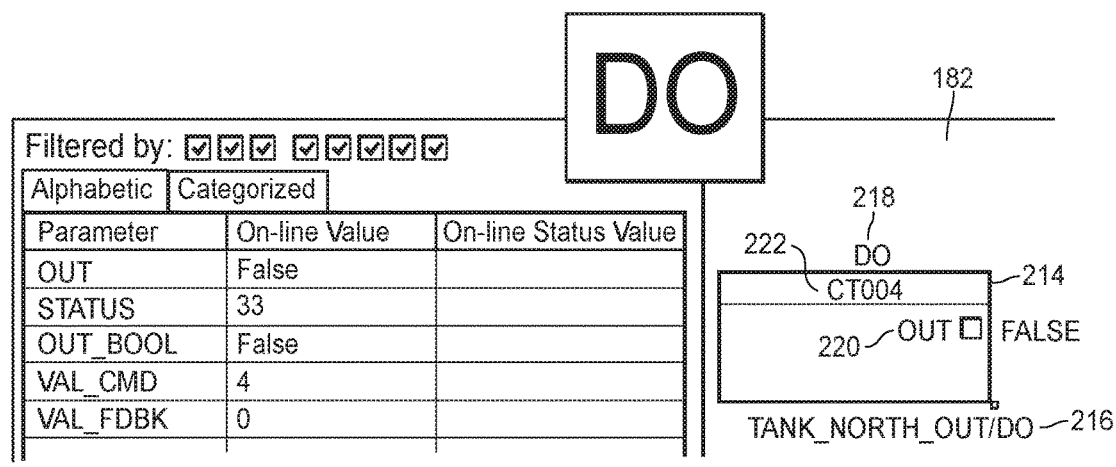
FIG. 6D is a fourth example integration function block instantiated in a configuration sheet.

Similarly, each of FIGS. 6B, 6C, and 6D depicts a respective configured integration function block, with FIG. 6B depicting an example integration AO function block 194, FIG. 6C depicting an example integration DI function block 204, and FIG. 6D depicting an example integration DO function block 214. Each of the integration function blocks 194, 204, and 214, like the integration function block 184, includes a respective PLC control tag name in a label 196, 206, 216, a respective function block type label 198, 208, 218, a respective device tag label 202, 212, 222, and a respective indication of each of the PLC tag parameters 200, 210, 220 associated with the control tag name.

Because each of the integration function blocks defined in the library definitions is defined according to the set of PLC tag parameters with which it is associated, it is possible, in some embodiments, to implement a generic integration function block. A generic integration function block is one that does not have a dedicated function block type (e.g., AI, AO, DI, DO, etc.) associated with it, but instead determines function block type based on the PLC tag parameters associated with the control tag name assigned to the generic integration function block. As an example, a generic integration function block may be placed on the configuration sheet 182. The process engineer may associate the generic integration function block with the PLC control tag name "Tank_North_Pressure." The configuration system 34 would retrieve or look up the tag parameters associated with the PLC control tag name "Tank_North_Pressure" and determine that the tag parameter names match those of the AO function block definition 164 for PLC Type 1 devices, and automatically assign that generic integration function block to be an AO function block for a PLC Type 1 device.

In embodiments, the configuration system 34 cooperates with the generic integration function block so as to automatically update according to the tag parameters associated with the PLC control tag name. Just as the configuration system 34 automatically adds the tag parameters associated with the control tag to the generic integration function block when the process engineer associates a control tag with the function block, the configuration system 34 may also automatically add tag parameters, remove tag parameters, or change data types based on changes to the tag parameters that are associated with the assigned PLC control tag, if the tag parameters associated with the PLC control tag name match a stored function block definition.

By way of example, consider an analog temperature signal that has only the process variable and a range of 0-200 degrees F. is being integrated into the control system 22 from a PLC. When the process engineer adds a generic integration function block and associates the temperature control tag name with the generic integration function block, the parameters for the temperature will be added automatically to the function block, and the function block transformed from a generic type to an AI type. Another analog input, a flow signal, is also integrated into the control system 22 from the PLC. This flow includes the process variable, transmitter range, process range, engineering units, mode, simulate enable, simulate value, alarm limits for high and low alarms, as well as high high and low low alarms, transmitter status, PLC module status, and an input reset. The user adds a second generic integration function block and associates the function block with the flow control tag name. The second generic integration function block automatically adds the parameters associated with the flow control tag, and transforms the function block from a generic type to an AI type. Now suppose that the temperature signal from the PLC is modified to add alarm limits. The integration function block already associated with the temperature control tag will automatically update to include the new parameters if there is a matching definition stored. Alternatively, suppose that the temperature signal from the PLC is modified instead to be a discrete rather than an analog. The integration function block associated with the temperature control tag would instead transform automatically into a DI function block.

The integration function blocks described herein may also in various embodiments be programmed to augment information received as tag parameters from the PLC. Some PLC implementations may not provide all of the parameters that would be expected by the controller 40 when directly coupled (via the I/O devices 48) to the field devices 44, 46. The PLC 49 may include a register that stores a value for a given parameter (e.g., a process variable), but may not include a register that stores a status of the parameter value (e.g., indicating that the status of the parameter is "good," updated, etc.), while one or more function blocks implemented in the controller 40 of the control system 22 may require that status parameter, for example, to ensure that parameter values being relied upon for control are accurate, to assess proper operation of a device, etc. The integration function blocks may recognize that required parameters are not present and may create and/or insert the missing parameters to comply with the requirements. As an example, the integration function block may be programmed to receive a process variable value from a register and, if the PLC 49 is not configured to provide a corresponding status parameter value, to assume the status value is "good" and create internally the corresponding status value so that it may be utilized by other function blocks receiving data from the integration function block, or functions within the integration function block. Alternatively, the integration function block may have access to the most recent write time of the register from which the process variable value is retrieved, and may create a status parameter value according to the write times of the register, determining, for instance, that if the register has been written within a previous predetermined time period (e.g., 1 minute, 5 minutes, etc.), that the status is "good."

In embodiments, the configuration system 34 additionally provides a software mechanism for integration of PLCs that do not implement control tags and/or that do not group all of the parameter tags associated with a particular value under a single control tag or do so in an organized fashion. In such PLCs, one or more of the parameters that are expected as a group by the controller 40 may reside in a register that is part of a data set different from the rest, or the expected parameters may be associated with two or more control tags of the PLC, rather than with a single control tag. Alternatively, a group of parameter tags expected by the controller 40 to be associated with one another, may not be grouped together at all because the PLC 49 may not implement control tags at all. Whatever the reason, the systems and methods described herein may, in embodiments, provide a means to create a new control tag to associate a plurality of registers from the PLC 49 such that the newly-created control tag may be associated, in turn, with an integration function block as described above.

Figure 7:
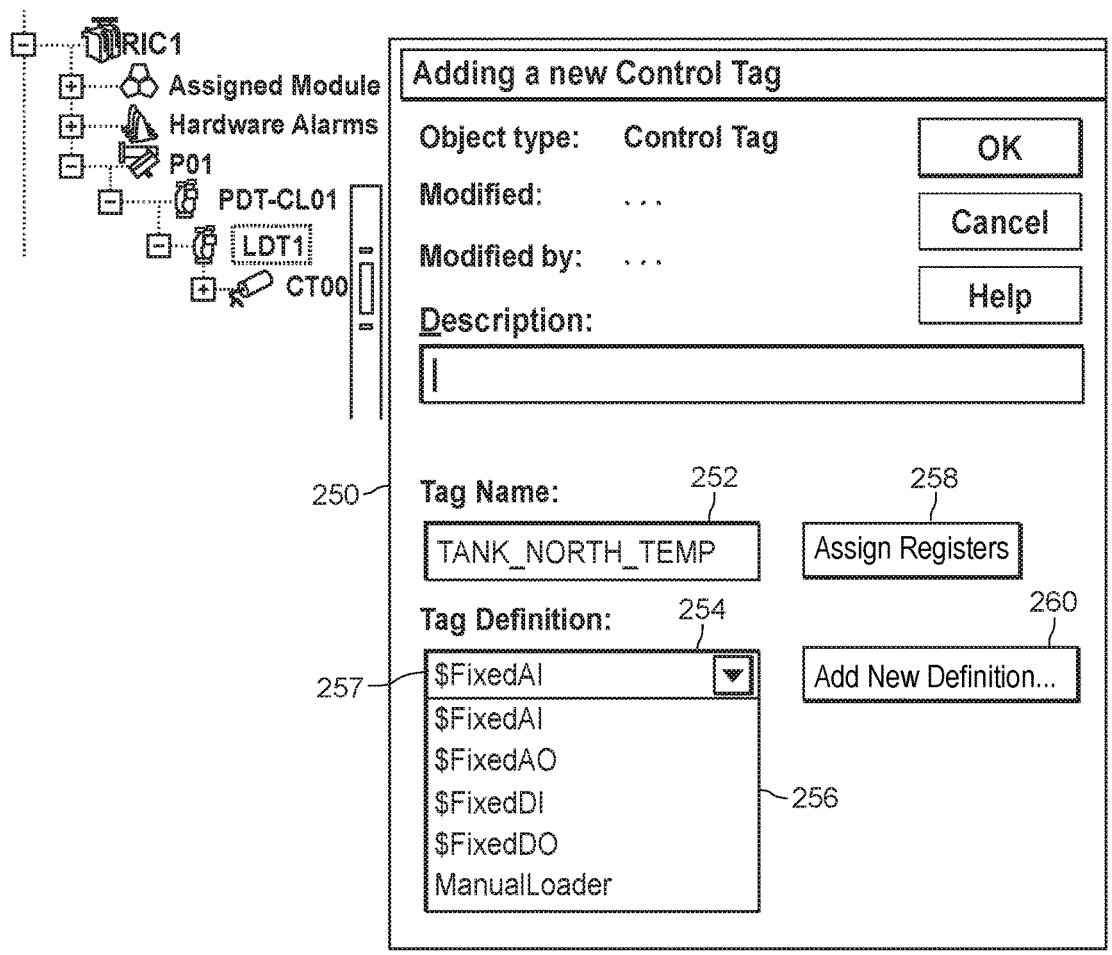
FIG. 7 depicts an example GUI for adding a new control tag.

FIG. 7 depicts a graphical user interface (GUI) 250 for adding a new control tag. The GUI 250 includes a tag name field 252 into which the process engineer may type the name of the tag that is being added. A field 254 provides a mechanism (e.g., a pull-down menu, a selection list, radio buttons, etc.) for selecting one of a plurality of tag definitions 256. For instance, FIG. 7 illustrates that tag definitions already present include Fixed AI, Fixed AO, Fixed DI, and Fixed DO tag definitions. The tag definitions 256 may correspond to a particular PLC type associated with the device to which the PLC control tag is being added. That is, if the PLC device is a particular make and/or model, the tag definitions 256 may include only those that correspond to that model. By way of example, if the PLC associated with the tag definition being added in FIG. 7 is, with reference to FIG. 5A, a "PLC Type 1" device, then the tag definitions 256 would correspond to the function blocks 162, 164, 166, and 168 in the group 160.

Having selected one of the tag definitions 256, the user may navigate (e.g., by activating a control 258 such as an "Assign Registers . . . " button) to a GUI 262, as depicted in FIG. 8. The GUI 262 may allow the process engineer to associate registers in the PLC with the various tag parameters 174 for the selected tag definition. FIG. 8 depicts the GUI 262 that might be displayed if the control engineer selected a FixedAI tag definition 257 in the GUI 250. The GUI 262 shown in FIG. 8 provides the controller parameters 172 and corresponding PLC tag parameters 174 for the FixedAI tag definition, and provides for each of the tag parameters 174 a field 264 into which the process engineer may enter the register number in which the tag parameter value is located (or a signal tag associated with that register, if signal tags are implemented in the PLC). In embodiments, each of the fields 264 may also have an associated control 266 that facilitates browsing through the registers and/or signal tags of the PLC to select a particular register or signal tag in which the value of the tag parameter 174 is found.

Figure 9:
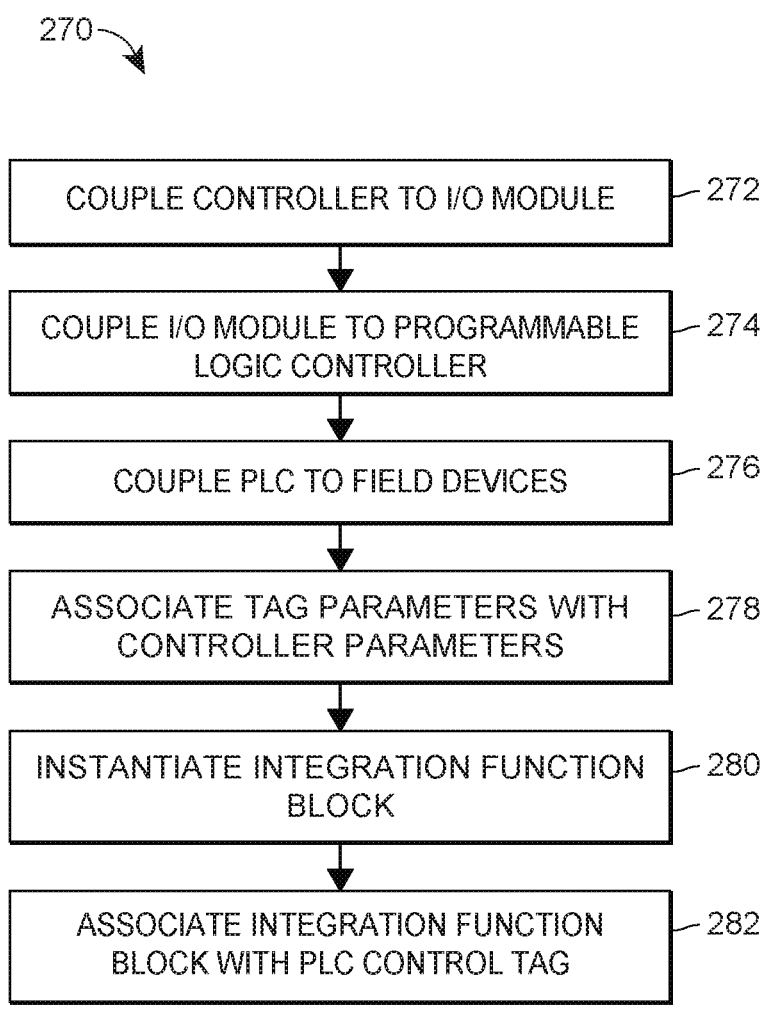
FIG. 9 depicts an example method for configuring the process control system.

A method 270 for configuring the process control system 22 is depicted in FIG. 9. Generally, the method includes configuring the hardware in the process control system 22, in addition to steps for configuring the distributed control system that operates the hardware. The method 270 includes communicatively coupling the controller 40 to the input/output module 48 (block 272), and the I/O module 48 to the PLC 49 (block 274). The controller 40 may be coupled to the I/O module 48 by any known method but, in an embodiment, the two are coupled using an Ethernet protocol. Similarly, in an embodiment the I/O module 48 is coupled to the PLC 49 by an Ethernet protocol, though any known method may be employed. The PLC 49 is communicatively coupled to the field devices 53 (block 276) and, for each of the field devices 53, has one or more registers storing data of values associated with the respective field device 53. The PLC is configured such that each of the field device 53 is associated with a PLC control tag, and each of the control tags is associated with one or more tag parameters corresponding to the registers for the respective field device 53, as described above.

The method also includes associating the tag parameters with corresponding parameters of the controller 40 so that, for each of the PLC control tags, there is a set of parameters of the controller 40 that is associated with the tag parameters for the PLC control tag (block 278). When an integration function block is instantiated (block 280), the method 270 includes associating the integration function block with a one of the PLC control tags (block 282). The integration function block, upon being associated with the one of the PLC control tags, automatically configures itself, according to the set of parameters of the controller that is associated with the tag parameters for the PLC control tag. The integration function block may, for example, automatically configure itself as an analog input function block, an analog output function block, a discrete input function block, a discrete output function block, a custom function block type, etc.

What is claimed:

1. A method for configuring a process control system for controlling a process in a process plant, the method comprising:
    communicatively coupling an input/output (I/O) module to a programmable logic controller (PLC) that is, in turn, communicatively coupled to a plurality of field devices, the PLC having, for each of the plurality of field devices, one or more registers storing data of values associated with the respective field device, the PLC configured such that each of the plurality of field devices is associated with a PLC control tag, and each PLC control tag is associated with one or more tag parameters corresponding to the one or more registers for the respective field device;
    configuring the I/O module to associate the tag parameters with corresponding parameters of a controller such that, for each of the PLC control tags, there is a set of parameters of the controller that is associated with the tag parameters for the PLC control tag;
    instantiating an integration function block object; and
    associating the integration function block object with a one of the PLC control tags,
    wherein the integration function block automatically configures itself, according to the set of parameters of the controller that is associated with the tag parameters for the PLC control tag, as one of the group consisting of: an analog input function block, a discrete input function block, an analog output function block, a discrete output function block, and a custom input or output function block.

2. A method according to claim 1, wherein the integration function block, if the tag parameters for the one of the PLC control tags change, is operable to automatically reconfigure itself as another of the group consisting of: an analog input function block, a discrete input function block, an analog output function block, a discrete output function block, and a custom input or output function block.

3. A method according to claim 1, wherein the integration function block, if the tag parameters for the one of the PLC control tags change, is operable to automatically reconfigure itself to: add inputs corresponding to new tag parameters, remove inputs corresponding to tag parameters no longer associated with the one of the PLC control tags, or both.

4. A method according to claim 1, wherein the integration function block, upon being associated with the one of the PLC control tags, adds to the integration function block inputs and/or outputs corresponding to the tag parameters associated with the one of the PLC control tags based on a tag definition.

5. A method according to claim 1, further comprising programmatically coupling the integration function block to a graphical object associated with a field device associated with the one of the PLC control tags.

6. An integration function block for downloading to a controller in a process control system for controlling a process in a process plant, the integration function block operable to:
    receive as a configuration parameter a control tag corresponding to one of a plurality of field devices in the process plant, the plurality of field devices coupled to a programmable logic controller (PLC);
    automatically configure itself, according to a set of parameters associated with the control tag, as one of the group consisting of: an analog input function block, a discrete input function block, an analog output function block, a discrete output function block, and a custom input or output function block.

7. An integration function block according to claim 6, further operable to automatically reconfigure itself, according to a new set of parameters associated with the control tag, as another of the group consisting of: an analog input function block, a discrete input function block, an analog output function block, a discrete output function block, and a custom input or output function block.

8. An integration function block according to claim 6, wherein the integration function block automatically configures itself, in part, according to a set of tag definitions.

9. An integration function block according to claim 8, wherein each of the set of tag definitions defines for a function block type, the correspondences between the set of parameters associated with the control tag and a set of controller parameters associated with the function block type.

10. An integration function block according to claim 8, wherein the set of tag definitions include tag definitions for function blocks associated with a plurality of PLC types, and wherein the integration function block automatically configures itself as a function block corresponding to a PLC-type according to a correspondence between the set of parameters associated with the control tag and a set of parameters in a one of the tag definitions corresponding to the PLC-type.

11. An integration function block according to claim 6, wherein the integration function block automatically reconfigures itself if the set of parameters associated with the control tag changes.

12. An integration function block according to claim 11, wherein reconfiguring itself if the set of parameters associated with the control tag changes comprises:
adding one or more inputs and/or outputs if one or more new parameters are associated with the control tag; and/or
removing one or more inputs and/or outputs if one or more of the parameters associated with the control tag are no longer associated with the control tag.

13. A system for controlling a process in a process plant, the system comprising:
a plurality of field devices operating to process materials in the process plant;
a controller programmed to send signals to and receive signals from the plurality of field devices, to effect control of the process in the process plant;
an input/output (I/O) module disposed between the controller and the plurality of field devices and operating to communicate the signals to the plurality of field devices from the controller and to communicate the signals from the plurality of field devices to the controller;
a programmable logic controller (PLC) disposed between a subset of the plurality of field devices and the I/O module, the PLC operating to control to the subset of the plurality of field devices and having a plurality of registers associated with each of the subset of the plurality of field devices; and
an integration function block instantiated in the controller, the integration function block operable, during configuration, to:
receive an assignment of a set of the registers of the PLC device, the set of the registers of the PLC device corresponding to PLC parameters of a one of the subset of the plurality of devices, each register corresponding to a parameter of the one of the subset of the plurality of devices;
create an association between the PLC parameter for each register in the set of registers and a corresponding parameter of the controller.

14. A system according to claim 13, wherein receiving an assignment of a set of registers of the PLC device comprises receiving an assignment of a PLC control tag associated with the set of registers.

15. A system according to claim 14, wherein the integration function block is selected by a user as having a specific type corresponding to one of an analog input function block, a discrete input function block, an analog output function block, or a discrete output function block.

16. A system according to claim 15, where in the integration function block is selected according to a type associated with the PLC.

17. A system according to claim 14, wherein the integration function block is operable, according to tag parameters associated with the PLC control tag, to determine a device type of the PLC and to automatically configure itself as one of the group consisting of: an analog input function block, a discrete input function block, an analog output function block, or a discrete output function block.

18. A system according to claim 13, wherein creating an association between the PLC parameter for each register in the set of registers and a corresponding parameter of the controller comprises creating the associations according to known relationships between the parameters of the register and the parameters of the controller.

19. A system according to claim 13, wherein the integration function block is further operable, during configuration, to automatically configure itself as one of the group consisting of: an analog input function block, a discrete input function block, an analog output function block, or a discrete output function block.

20. A system according to claim 13, wherein receiving an assignment of a set of registers of the PLC device comprises receiving an assignment of a PLC control tag, the control tag associated with the set of registers, and
wherein the integration function block is further operable, if the registers associated with the PLC control tag change, to reconfigure itself.

21. A system according to claim 20, wherein the integration function block is operable to add inputs to correspond to registers newly associated with the PLC control tag.

22. A system according to claim 20, wherein the integration function block is operable to remove inputs to correspond to registers removed from association with the PLC control tag.

23. A system according to claim 20, wherein the integration function block is further operable, during configuration, to automatically configure itself as one of the group consisting of:
an analog input function block, a discrete input function block, an analog output function block, or a discrete output function block, and
wherein the integration function block is operable to reconfigure itself, if the registers associated with the PLC control tag change, as a different one of the group consisting of: an analog input function block, a discrete input function block, an analog output function block, or a discrete output function block.

* * * * *